(12) United States Patent
Mahnad et al.

(10) Patent No.: US 7,136,255 B2
(45) Date of Patent: Nov. 14, 2006

(54) SERVO METHODS AND SYSTEMS USING MASKED MEDIUM EDGE POSITION SENSORS

(75) Inventors: Faramarz Mahnad, Waltham, MA (US); George A. Saliba, Northborough, MA (US); Leo Cappabianca, Worcester, MA (US); Mitchell R. Steinberg, Upton, MA (US); James Donati, Wilbraham, MA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/942,678

(22) Filed: Sep. 15, 2004

(65) Prior Publication Data

US 2005/0094308 A1   May 5, 2005

Related U.S. Application Data

(60) Provisional application No. 60/512,999, filed on Oct. 20, 2003.

(51) Int. Cl.
*G11B 5/584* (2006.01)

(52) U.S. Cl. ..................... 360/77.12; 360/75
(58) Field of Classification Search ............. 360/77.12, 360/77.03
See application file for complete search history.

(56) References Cited

U.S. PATENT DOCUMENTS

| | | | |
|---|---|---|---|
| 2,937,239 A | 5/1960 | Walker et al. | |
| 3,633,038 A * | 1/1972 | Falk | 250/201.1 |
| 3,829,895 A | 8/1974 | Tanaka et al. | |
| 3,919,697 A | 11/1975 | Walker | |
| 3,971,002 A | 7/1976 | Bricot et al. | |
| 4,056,830 A | 11/1977 | Smith | |
| 4,110,799 A | 8/1978 | Bergmans et al. | |
| 4,149,204 A | 4/1979 | Marino et al. | |
| 4,176,381 A | 11/1979 | de Niet et al. | |
| 4,321,634 A | 3/1982 | Lehureau | |
| 4,334,252 A | 6/1982 | Toriu | |
| 4,392,163 A | 7/1983 | Rijckaert et al. | |
| 4,422,112 A | 12/1983 | Tanaka | |
| 4,424,541 A | 1/1984 | Koinuma et al. | |
| 4,439,793 A | 3/1984 | Nater | |
| 4,449,082 A | 5/1984 | Webster | |
| 4,472,750 A | 9/1984 | Klumpp et al. | |
| 4,479,156 A | 10/1984 | Kumagai et al. | |
| 4,502,082 A | 2/1985 | Ragle et al. | |
| 4,539,615 A | 9/1985 | Arai et al. | |

(Continued)

FOREIGN PATENT DOCUMENTS

EP   0 854 471 A1   7/1998

(Continued)

OTHER PUBLICATIONS

European Search Report mailed on Mar. 4, 2005 for EP patent application No. 04256389.0, 3 pages.

*Primary Examiner*—K. Wong
(74) *Attorney, Agent, or Firm*—Morrison & Foerster LLP

(57) ABSTRACT

The present invention provides servo systems and accompanying methods for determining the relative position of a transducer head to a magnetic storage tape utilizing the position of the magnetic storage tape edge. In one example, a method for positioning a transducer head relative to a magnetic storage medium includes optically sensing a position of an edge of the storage medium, and repositioning the transducer head relative to the storage medium based on the read signal and the position of the edge of the storage medium.

18 Claims, 6 Drawing Sheets

U.S. PATENT DOCUMENTS

| | | | |
|---|---|---|---|
| 4,679,104 A | 7/1987 | Dahlerud | |
| 4,685,005 A | 8/1987 | Fields, Jr. | |
| 4,802,030 A | 1/1989 | Henry et al. | |
| 4,816,939 A * | 3/1989 | Ford et al. | 360/77.03 |
| 4,866,548 A | 9/1989 | Rudi | |
| 4,975,791 A | 12/1990 | Eggebeen | |
| 4,979,051 A | 12/1990 | Eggebeen | |
| 5,050,017 A | 9/1991 | Carr et al. | |
| 5,055,959 A | 10/1991 | Saliba | |
| 5,072,319 A | 12/1991 | Kohri et al. | |
| 5,121,270 A | 6/1992 | Alcudia et al. | |
| 5,126,895 A | 6/1992 | Yasuda et al. | |
| 5,132,861 A | 7/1992 | Behr et al. | |
| 5,257,148 A | 10/1993 | Solhjell et al. | |
| 5,262,908 A | 11/1993 | Iwamatsu et al. | |
| 5,285,331 A | 2/1994 | White | |
| 5,289,328 A | 2/1994 | Saliba | |
| 5,294,791 A * | 3/1994 | Pahr | 250/548 |
| 5,294,803 A * | 3/1994 | Pahr | 250/559.36 |
| 5,371,638 A | 12/1994 | Saliba | |
| 5,426,551 A | 6/1995 | Saliba | |
| 5,448,430 A | 9/1995 | Bailey et al. | |
| 5,452,152 A | 9/1995 | Rudi | |
| 5,488,519 A | 1/1996 | Ishida et al. | |
| 5,523,904 A | 6/1996 | Saliba | |
| 5,563,868 A | 10/1996 | Farnsworth et al. | |
| 5,588,007 A | 12/1996 | Ma | |
| 5,600,500 A | 2/1997 | Madsen et al. | |
| 5,600,505 A | 2/1997 | Ayres | |
| 5,617,269 A | 4/1997 | Gordenker et al. | |
| 5,757,575 A | 5/1998 | Hallamesek et al. | |
| 5,796,537 A | 8/1998 | Goker et al. | |
| 5,815,337 A | 9/1998 | Milo | |
| 5,844,814 A | 12/1998 | Chliwnyj et al. | |
| 5,847,892 A | 12/1998 | Goker | |
| 5,862,014 A | 1/1999 | Nute | |
| 5,940,238 A | 8/1999 | Nayak et al. | |
| 5,949,604 A | 9/1999 | Saliba | |
| 5,973,872 A | 10/1999 | Saliba | |
| 5,973,874 A | 10/1999 | Panish et al. | |
| 5,978,188 A | 11/1999 | Kaaden et al. | |
| 5,982,711 A | 11/1999 | Knowles et al. | |
| 6,005,737 A | 12/1999 | Connolly et al. | |
| 6,018,434 A | 1/2000 | Saliba | |
| 6,061,199 A | 5/2000 | Goker et al. | |
| 6,075,678 A | 6/2000 | Saliba | |
| 6,084,740 A | 7/2000 | Leonhardt et al. | |
| 6,088,184 A | 7/2000 | Hu | |
| 6,108,159 A | 8/2000 | Nute et al. | |
| 6,118,605 A | 9/2000 | Call et al. | |
| 6,128,155 A | 10/2000 | Sugawara et al. | |
| 6,130,792 A | 10/2000 | Goker | |
| 6,134,072 A | 10/2000 | Zweighaft | |
| 6,141,174 A | 10/2000 | Judge et al. | |
| 6,188,532 B1 | 2/2001 | Albrecht et al. | |
| 6,222,698 B1 | 4/2001 | Barndt et al. | |
| 6,236,529 B1 | 5/2001 | Leonhardt et al. | |
| 6,246,535 B1 | 6/2001 | Saliba et al. | |
| 6,275,349 B1 | 8/2001 | Smith | |
| 6,275,350 B1 | 8/2001 | Barndt | |
| 6,285,519 B1 | 9/2001 | Goker | |
| 6,307,718 B1 | 10/2001 | Kasetty | |
| 6,331,920 B1 | 12/2001 | Albrecht et al. | |
| 6,339,522 B1 | 1/2002 | Hoelsaeter | |
| 6,366,422 B1 | 4/2002 | Daniel et al. | |
| 6,433,951 B1 * | 8/2002 | Lubratt | 360/77.12 |
| 6,493,174 B1 * | 12/2002 | Stubbs | 360/77.12 |
| 6,512,651 B1 | 1/2003 | Eifert et al. | |
| 6,545,837 B1 | 4/2003 | Tran | |
| 6,570,731 B1 | 5/2003 | Burke et al. | |
| 6,700,729 B1 | 3/2004 | Beck et al. | |
| 6,768,608 B1 * | 7/2004 | Saliba et al. | 360/77.03 |
| 6,775,092 B1 | 8/2004 | Zweighaft et al. | |
| 6,801,383 B1 | 10/2004 | Zweighaft et al. | |
| 6,839,196 B1 | 1/2005 | Trivedi | |
| 2002/0176200 A1 | 11/2002 | Trivedi | |
| 2003/0043498 A1 | 3/2003 | Johnson et al. | |
| 2004/0042115 A1 | 3/2004 | Saliba et al. | |
| 2005/0083600 A1 | 4/2005 | Mahnad et al. | |
| 2005/0083601 A1 | 4/2005 | Mahnad et al. | |
| 2005/0083602 A1 * | 4/2005 | Saliba et al. | 360/77.12 |
| 2005/0088770 A1 | 4/2005 | Saliba et al. | |
| 2005/0088776 A1 | 4/2005 | Saliba et al. | |

FOREIGN PATENT DOCUMENTS

| | | |
|---|---|---|
| EP | 0 854 471 B1 | 7/1998 |
| EP | 0 919 990 A2 | 6/1999 |
| EP | 0 919 990 A3 | 6/1999 |
| EP | 0 996 127 A2 | 4/2000 |
| EP | 0 996 127 A3 | 4/2000 |
| EP | 0 996 127 B1 | 4/2000 |
| JP | 59-185020 A | 10/1984 |

* cited by examiner

SERVO METHODS AND SYSTEMS USING MASKED MEDIUM EDGE POSITION SENSORS

CROSS REFERENCE TO RELATED APPLICATION

The present application claims benefit of earlier filed provisional patent application, U.S. Application No. 60/512,999, filed on Oct. 20, 2003, and entitled "Masked Position Sensors and Control Systems," which is hereby incorporated by reference as if fully set forth herein.

BACKGROUND

1. Field of the Invention

The invention and its various aspects relate generally to magnetic tape storage devices and systems, and more particularly to methods and systems for head positioning servo systems.

2. Description of the Related Art

Digital tape-recording remains a viable solution for storage of large amounts of data. Conventionally, at least two approaches are employed for recording digital information onto magnetic recording tape. One approach calls for moving a magnetic tape past a rotating head structure that reads and writes user information from discontinuous transverse tracks. Interactive servo systems are typically employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity, and retrieval performance, is desired of all commercially viable mass storage devices and media. In the case of linear tape recording a popular trend is toward multi-head, multi-channel fixed head structures with narrowed recording gaps and data track widths so that many linear data tracks may be achieved on a tape medium of a predetermined width, such as one-half inch width tape. To increase the storage density for a given cartridge size the bits on the tape may be written to smaller areas and on a plurality of parallel longitudinal tracks. As more data tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head. LTM may be caused by many factors including, tape slitting variations, tension variations, imperfections in the guiding mechanism, friction variations mainly at the head, and environmental factors such as heat and humidity. These factors affect LTM in various ways. Some may cause abrupt momentary jumps while others may cause a static shift. Generally, LTM is unpredictable and unrepeatable.

In multi-head, multi-channel magnetic tape storage systems, random lateral tape motion is generally a limiting factor in achieving higher track densities and thus higher user data capacity per tape. In order to maintain proper alignment of the head with the storage tape and data tracks on the tape, the tape is generally mechanically constrained to minimize LTM and data retrieval errors. Miss-registration between the head and the data track can cause data errors during readback and data loss on adjacent tracks during writing.

Various techniques for increasing the track density on magnetic tape employ recording servo information on the tape to provide positioning information to a tape drive system during writing and/or reading processes. Some systems magnetically record a continuous track of servo information which is then read and used as a position reference signal. For example, a variety of techniques have been used including dedicated and embedded magnetic servo tracks, time and amplitude magnetic servo tracks, and the like. Other systems may intersperse or embed servo information with user data. Exemplary tape drive systems and methods are described, for example, in U.S. Pat. Nos. 6,246,535, 6,108,159, and 5,371,638, and U.S. patent application Ser. No. 09/865,215, all of which are hereby incorporated by reference herein in their entirety.

What is desired are methods and systems for more accurately positioning read and/or write heads with respect to data tracks of a magnetic storage tape in a tape drive, and doing so with increased accuracy and reduced cost and complexity.

BRIEF SUMMARY

One aspect of the present invention provides servo systems and accompanying methods for determining the relative position of a transducer head to a magnetic storage tape by optically detecting at least one edge of the storage medium. The exemplary servo system and methods may be used alone or in combination with other known servo systems, e.g., optical or magnetic servo systems and the like.

In one example, a method for positioning a transducer head relative to a magnetic storage medium includes optically sensing a position of an edge of the storage medium, and repositioning the transducer head relative to the storage medium based on the position of the edge of the storage medium. In one example, the position of the edge of the storage medium may be determined by illuminating a window formed by a transmissive portion of a mask and an edge of the storage medium, wherein the mask is in a fixed spatial relationship to the transducer head, and detecting an intensity of light passing through the window. The head may be repositioned to keep the intensity of light passing through the window substantially constant.

In another example, the position of the edge of the storage medium may be determined by illuminating a first mask and a second mask and detecting an intensity of light passing through the first mask and second mask with a detector, where the first mask is stationary with respect to the transducer head, and the second mask is stationary with respect to the detector.

According to another aspect of the present invention a servo system is provided. In one example, the system includes a head assembly, a magnetic read element, a light source, a detector, and a controller. The light source illuminates an edge of a magnetic storage medium and the detector detects the light illuminating the edge of the magnetic storage medium. A controller is configured to adjust the position of the transducer head relative to the storage medium based, at least in part, on the detected light associated with the position of the tape edge.

Various aspects and examples of the present inventions are better understood upon consideration of the detailed description below in conjunction with the accompanying drawings and claims.

DETAILED DESCRIPTION

Figure 1:
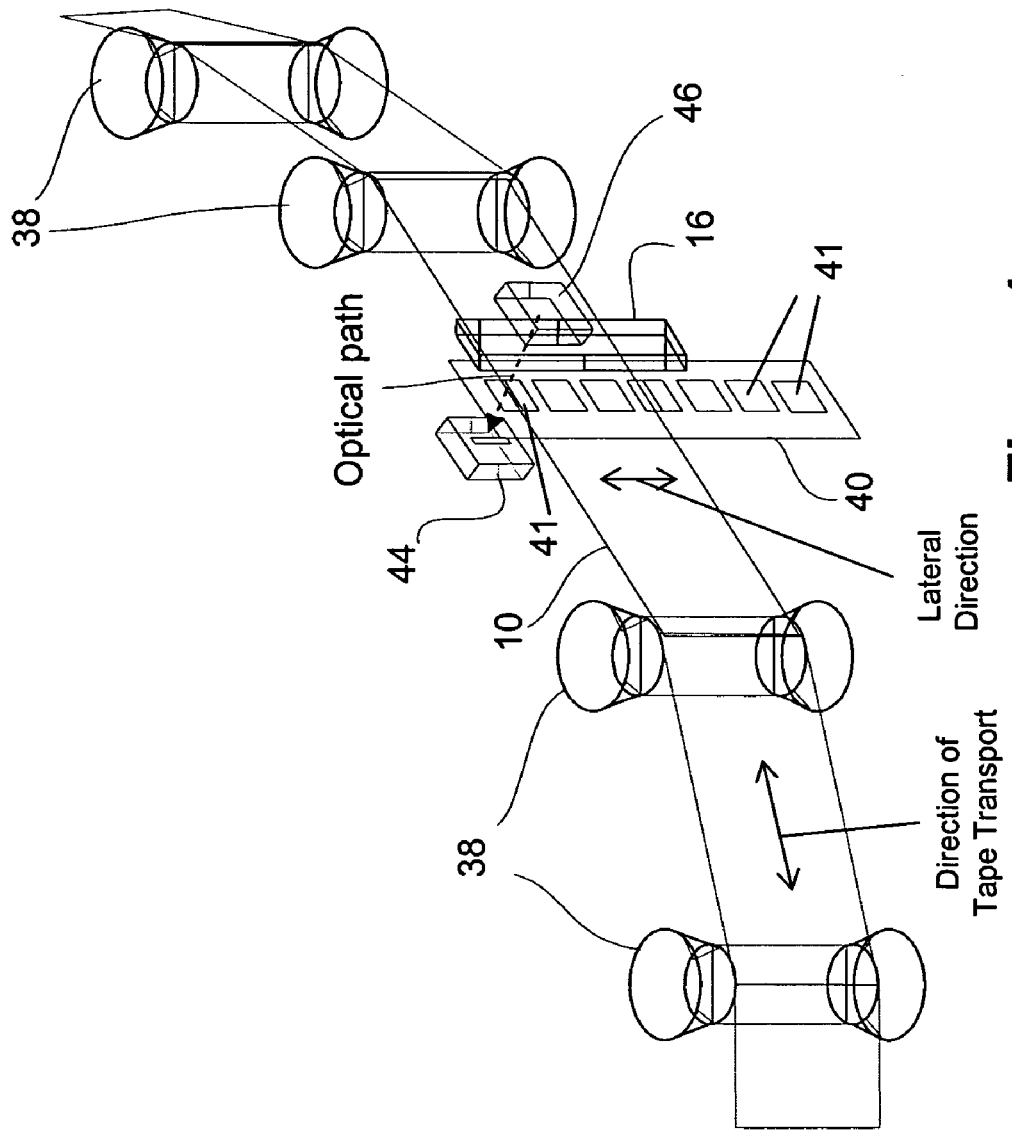
FIG. 1 illustrates an exemplary servo system including an optical servo system configured to sense the edge of a storage medium.

Various methods and systems for sensing lateral tape motion and providing calibration and/or position information for a servo system are provided. The following description is presented to enable a person of ordinary skill in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

Accurately positioning a transducer head with respect to a storage tape and data tracks within a tape drive during writing and reading processes is one of the main challenges in the area of magnetic storage tape systems. Generally, a closed loop servo system, deployed by the tape drive electromechanical system, utilizes an estimate of the head's position relative to the storage tape to align the transducer head to a data track position. Exemplary methods and systems described below gather positional information for the positioning of a transducer head relative to data tracks by sensing at least one edge of the storage tape. The exemplary methods and systems may be used without servo data or separate servo systems including, e.g., mechanical structures to mount an optical system or the like for detecting servo positioning information. With reduced mechanical structure, there may be an increase in servo actuator response, enabling higher actuator band width and finer track width resolution.

Additionally, because the servo system uses the tape edge for servoing, a drive system may advantageously write to and read from various format storage cartridges and data formats. For example, Super Digital Linear Tape ("Super DLT" or "SDLT") drives, and Linear Tape Open ("LTO") drives may utilize exemplary servo systems that are compatible with both magnetic servo of LTO and optical servo of Super DLT. In one example, an optical servo system detects at least one edge of the tape to provide relative positional information for the read/write head. The exemplary methods and systems may assist various additional servo system(s) or subsystem(s) of a tape drive to align the read/write head with data tracks during reading or writing processes.

Exemplary tape drive systems and methods that may be used with the various exemplary systems and methods of the present invention are described, for example, in U.S. Pat. Nos. 6,246,535, 6,108,159, and 5,371,638, and U.S. patent application Ser. No. 09/865,215, all of which are hereby incorporated by reference as if fully set forth herein. It will be recognized by those of ordinary skill in the art that various other suitable tape drive and servo systems may be used with one or more of the exemplary systems and methods of the present invention.

In one exemplary servo system, optical servo information associated with the relative position of an edge of the magnetic storage medium (e.g., 0.5 inch storage tape), is used to sense relative position of the storage tape and magnetic read/write head. In particular, for a given read/write head geometry, the relative position of the read/write head with respect to a location of the track being accessed for writing or reading data (an active track) can be accurately estimated based on the relative position of the head with respect to the edge of the storage tape. The servo system may use the positional information to adjust the relative position of the magnetic read/write head and the tape. In one example, the servo system uses an optical servo method as a primary servo system and magnetic servo of an existing data structure to fine-position the read/write head. The following description details exemplary optical servo methods and exemplary magnetic read servo methods.

The relative position of a read/write head with respect to data track locations can be accurately estimated if the relative position of the read/write head with respect to the edge of the storage medium or tape is known. The relative position of the edge may be sensed relative to the head element with a suitable optical system.

FIG. 1 illustrates one exemplary optical servo system for sensing the relative position of an edge of a storage tape 10. The optical servo system includes a light source 46, stationary optical sensing device 44, and a patterned mask 40 configured to sense the edge of storage tape 10. Storage tape 10 is guided by rollers 38 from a supply reel (e.g., within a cartridge), to a take-up reel (e.g., within a tape drive system) and adjacent read/write head 16 and the optical servo system (generally including light source 46, sensing device 44, mask 40, and a suitable servo controller).

An optical path is shown in FIG. 1 extending between light source 46 and optical sensing device 44. In one example, sensing device 44 includes an area or linear detector aligned along the lateral direction. Sensing device 44 detects light through a window blocked by the optical image of the edge of storage tape 10 on one side and an optically coded mask 40 attached or in a fixed spatial relationship to the read/write head 16 on the other side. Mask 40 includes at least one area of varying transparency to light from light source 46, e.g., aperture 41, and mask 40 is coupled or in a fixed spatial relationship to head 16. During operation, tape 10 will at least partially obstruct the at least one aperture 41 to create at least one window defined by the area of aperture 41 less the area of tape 10 which overlaps aperture 41 along the optical path between light source 46 and sensing device 44. In this example, the lateral length of the aperture is set less than the width of tape 100.

Light source 46 illuminates, e.g., with incoherent light, the at least one window formed by tape 10 and aperture 41. Sensing device 44 detects light passing through the window and provides a measure of the relative position of the edge of tape 10 to the head 16. A controller may adjust the position of head 16 in response to signals from sensing device 44 associated with the detected light. For example, the controller may adjust the position of head 16 to maintain the intensity of the detected light at a particular value, thereby keeping the window at the same or similar size.

In one example, sensing device 44 includes a transmissive optical sensor. Transmissive optical sensors are well established and characterized devices in the industry. They are also relatively inexpensive and readily available, however, various suitable sensors may be used, e.g., CCD or CMOS devices. Changes to the read/write head and tape path assembly in existing drive systems, such as the SDLT drive, are generally minor and inexpensive and will be easily recognized by those of ordinary skill in the art.

EXAMPLE I

To test the feasibility of using a tape edge sensor and track the LTM of a storage tape, an optical servo system including a transmissive optical sensing device similar to that shown in FIG. 1 was attached to an SDLT220 drive, manufactured by Quantum Corporation. The sensing device was positioned such that it monitored the position of the top edge of the tape relative to the position of the read/write head. The gain and offset of the accompanying electronic circuitry were set so that an analog signal was generated with a range of 0 to 3 volts that corresponded to approximately five 24-micron wide SDLT220 format data tracks. The analog signal was used as an input to an A/D converter on the SDLT220 tape drive. Each 0.6 volt change in signal (44 out of 256 A/D bits) represented approximately 24 microns.

Figure 5:
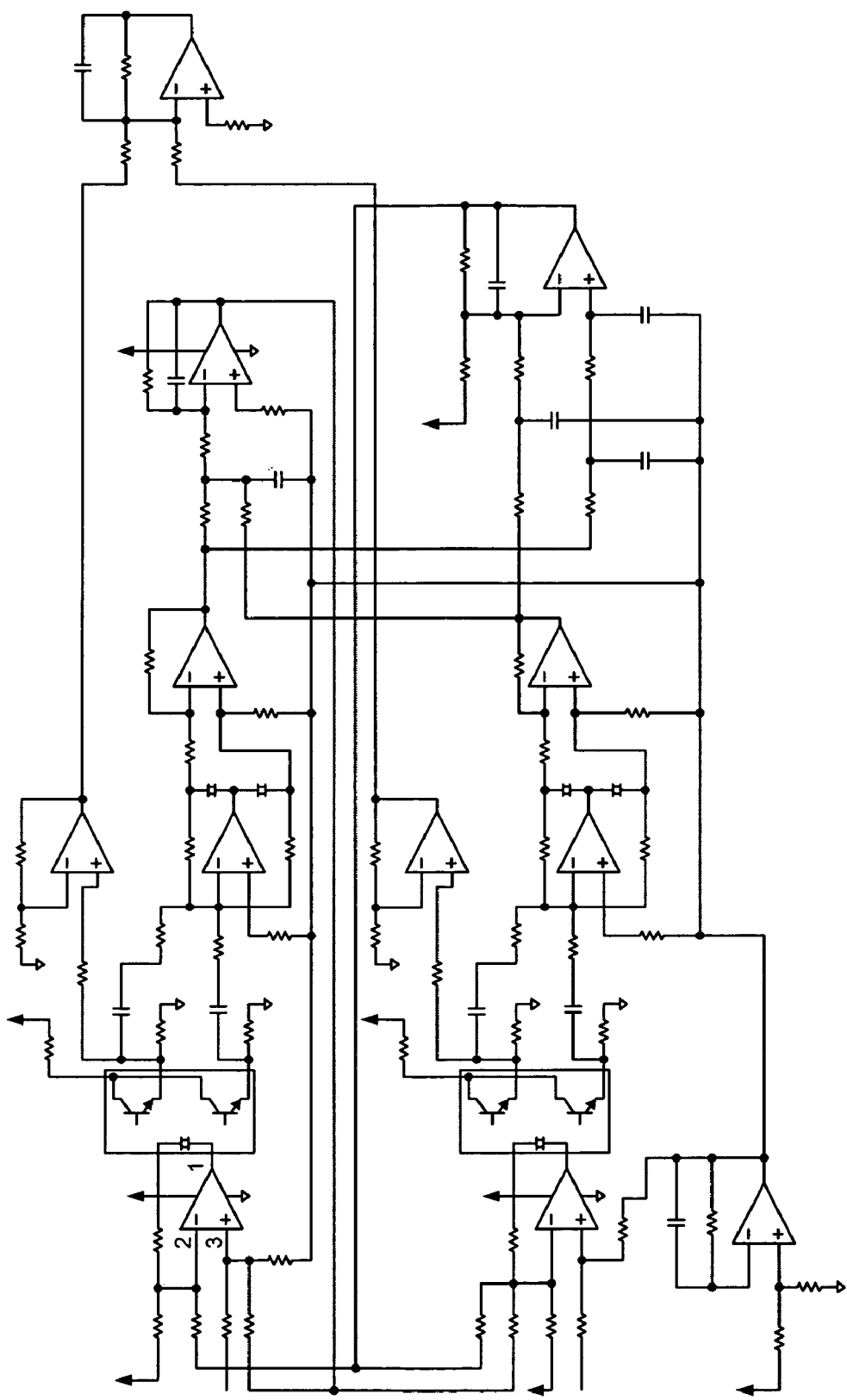
FIG. 5 illustrates an exemplary schematic diagram of circuitry for an optical servo system.

The tape edge sensor signal was calibrated and suitable firmware was written for the SDLT220 to test the ability to track to the tape edge sensor. FIG. 5 is an exemplary schematic diagram of the circuitry used to maintain constant LED light level and to condition the signal for the input to the A/D converter; of course, other designs may be implemented to achieve similar results. Two conditions were tested:

1. The drive was loaded and calibrated with a conventional SDLT220 tape and several data tracks were written in conventional SDLT220 servo mode, i.e., using the optical tracking servo in the drive. The data tracks were then read back by the drive using the optical tracking servo. As the drive was reading, a command sequence was sent to the drive via a diagnostic communication port that switched the drive from using the conventional optical tracking servo to a tape edge servo system (substantially as shown and described in FIG. 1). The drive continued reading the data track within reasonable data error rates using the tape edge servo system. Additionally, the drive was able to alternate between standard optical tracking servo and the tape edge servo system while continuing to read the data.

2. The drive was loaded and calibrated with a conventional SDLT220 tape, where the beginning of each forward data track was written using the conventional SDLT220 optical tracking servo. Part way along the track, a command sequence was sent to the drive via a diagnostic communication port that switched the drive from optical tracking servo to the tape edge servo, and the remainder of the track was written using the tape edge servo. The data tracks were read back using the optical tracking servo for the beginning of each track. Part way through each forward track, a command sequence was sent to the drive via a diagnostic communication port which switched the drive from using the conventional optical tracking servo to the tape edge servo. The drive was able to continue reading the tracks within reasonable data error rates.

In another exemplary optical servo system, an optical sensor and an optically encoded mask attached to the read/write head are provided. In this example, the mask (or masks) includes at least two apertures or transparent portions. The tape, bounded by a first edge, may partially obstruct a first aperture to create a first window, and the tape, bounded by a second edge opposite the first edge, may partially obstruct a second aperture to create a second window. In this manner, if lateral tape motion enlarges the first window, it reduces the second window.

A sensing device may include a first detector for detecting light from the first window, and a second detector for detecting light from the second window. By virtue of the light detected by the first and second detectors, the controller is provided with information concerning relative position of the tape to the read/write head and the direction of motion of the tape with respect to the mask.

A light source may include a first light source for illuminating the first aperture, and a second light source for illuminating the second aperture. The controller may control the first and second light sources to compensate for ambient effects on the determination of the relative position of the tape to the head, such as ambient light and temperature.

The servo system may also include a third aperture in a mask disposed in the lateral direction, and third and fourth detectors. The third detector detects light through the third aperture obstructed by the tape bounded by the first tape edge, and the fourth detector detects light through the fourth aperture obstructed by the tape bounded by the second tape edge. The total light measured by the third and fourth detectors will be substantially constant, assuming no ambient effects, if the tape width is constant. Thus, any change in the total light represents a variation in the tape width due to tape edge irregularities, for example. By virtue of measuring the light with the third and fourth detectors, the controller may compensate for tape edge irregularities.

Figure 2:
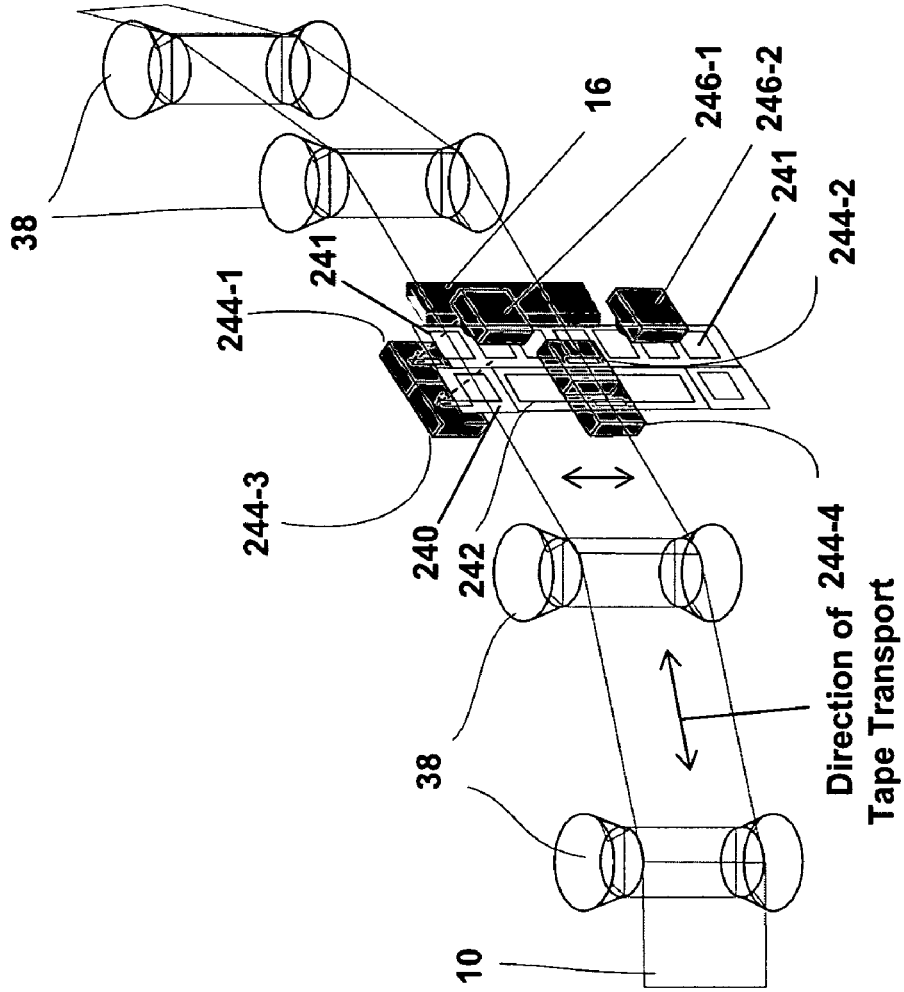
FIG. 2 illustrates another exemplary servo system including an optical servo system configured to sense the edge of a storage medium.

FIG. 2 illustrates an exemplary system having one or more masks with first, second, and third apertures. In particular, optical paths of four optical sensing devices or sensors 244-1, 244-2, 244-3, and 244-4 are at least partially blocked from light sources 246-1 and 246-2 by images of the opposing edges of tape 10; two sensors 244-1, 244-3 aligned with the top edge and two sensors aligned with the bottom edge 244-2, 244-4. An optically coded mask 240 is attached or fixed in place relative to read/write head 16. Sensors 244-1, 244-2, 244-3, 244-4 provide four signals, two of which (sensors 244-1, 244-2) are proportional to the relative position of the head with respect to the edge of the tape 10. The vertical portion of mask 40 corresponding to sensors 244-1, 244-2 includes a column of apertures 241, where each aperture 241 may be shorter in the lateral direction than the width of tape 10. Additionally, sensors 244-3, 244-4 may provide signals proportional to the lateral motion of the tape as registered by the tape edge motion. The vertical mask portion corresponding to sensors 244-3 and 244-4 includes a long vertical aperture 242 that may be longer in the lateral direction than the width of tape 10 and transparent throughout the expected range of LTM. In other example, two or more masks may be used in place of a single mask 240.

The following equations represent the components of motion for each sensor output:

$$b1 = K_{11}*(hp-LTM)$$

$$b2 = K_{21}*(1-hp+LTM)$$

$$b3 = K_{12}*(1-LTM)$$

$$b4 = K_{22}*(LTM)$$

where b1, b2, b3, b4 are the sensor outputs corresponding to sensors 244-1, 244-2, 244-3, 244-4 respectively, and hp and LTM represent the head and tape motions upward in FIG. 2 (normalized to: 0<hp−LTM<1). $K_{nn}$ represent the gain coefficient for each sensor, which depends on the light source intensity and dimensions of the mask apertures 241, 242. The output value of the sensors also varies as a function of ambient temperature and light intensity. This dependence on the ambient temperature and light should be minimized in order to achieve accurate scaling for the output of the sensors.

Figure 3:
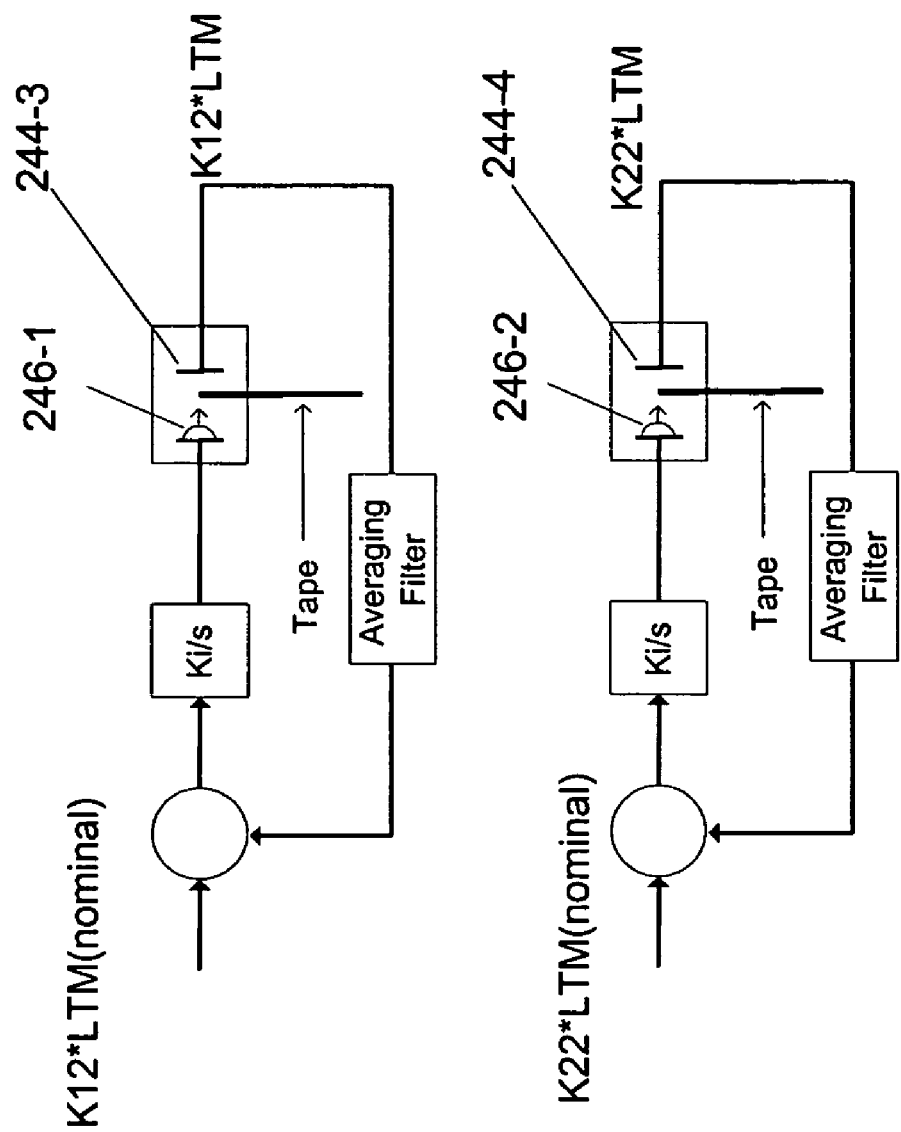
FIG. 3 illustrates an exemplary feedback loop for a servo system.

The mean value of the LTM should remain constant (because the tape is kept stationary with respect to the sensor location) such that the average values of b3 and b4 will remain substantially constant in the absence of ambient temperature and light variation. Therefore, two feedback control loops, e.g., as illustrated in FIG. 3, which would modify the intensity of the light source and keep the average values of b3 and b4 to a nominal value ($K_{12}$*LTM(nominal); $K_{22}$*LTM(nominal)), are sufficient to minimize the sensitivity of $K_{12}$ and $K_{22}$ in the above equations to ambient temperature and light.

Light source 246-1 illuminates both sensors 244-1 and 244-3. Light source 246-2 illuminates both sensor 244-2 and 244-4. Given that the ambient light and temperature variations are substantially the same for 244-1, 244-3 and 244-2, 244-4, the exemplary method will also minimize the sensitivity of $K_{11}$ and $K_{21}$ to these variations. Both $K_{11}$ and $K_{21}$ can be set to equal values by the feedback control loops:

$K_{12}$*LTM(nominal)=$K_{22}$*LTM(nominal), where
$K_{12}$=$K_{22}$=Kr; $K_{11}$=$K_{21}$=Ks Then the value of Ks in the linear region of the sensor can be determined by the calibration techniques initiated by the servo subsystem.

Therefore a relative position signal,

Pr=b2-b1=Ks*(1-2hp+2LTM)

represents the resultant relative position of the head with respect to the edge of the tape.

If the tape edge is damaged, however, the sensor signals b1, b2, b3, and b4, individually, will not accurately register the relative head position with respect to the storage tape or data tracks. One exemplary method of improving the accuracy of the positioning signal, in the presence of tape edge damage, is to determine the common and differential components of these signals as a means to distinguish between tape motion, e.g., LTM, and tape edge irregularities from tape edge damage and the like.

For example, if Td1 and Td2 represent the upper and lower tape edge irregularities respectively, then b3 and b4 can be rewritten as:

b3=Kr*(LTM+Td1)

b4=Kr*(1-LTM+Td2)

Td, the measure of tape edge irregularities is determined by:

Td=b3+b4=Kr(1+Td1+Td2)

The Td signal can be monitored in order to apply a filter (such as a low pass filter) to the signal Pr, thus reducing the sensitivity of Pr to Td. For example, the filter could decrease its cutoff frequency in response to increasing Td, thereby reducing the sensitivity of the filtered Pr to the most recent values of Pr that are contaminated by Td.

Those of ordinary skill in the art will recognize that the above example is illustrative only and various other system configurations, feedback methods, and the like are possible. For example, various light sources, optical sensors, masks, feedback loops, etc., may be employed in various numbers and configurations. Additionally, the exemplary methods and systems may be carried out in firmware, software, hardware, or any combination thereof.

Figure 4A:
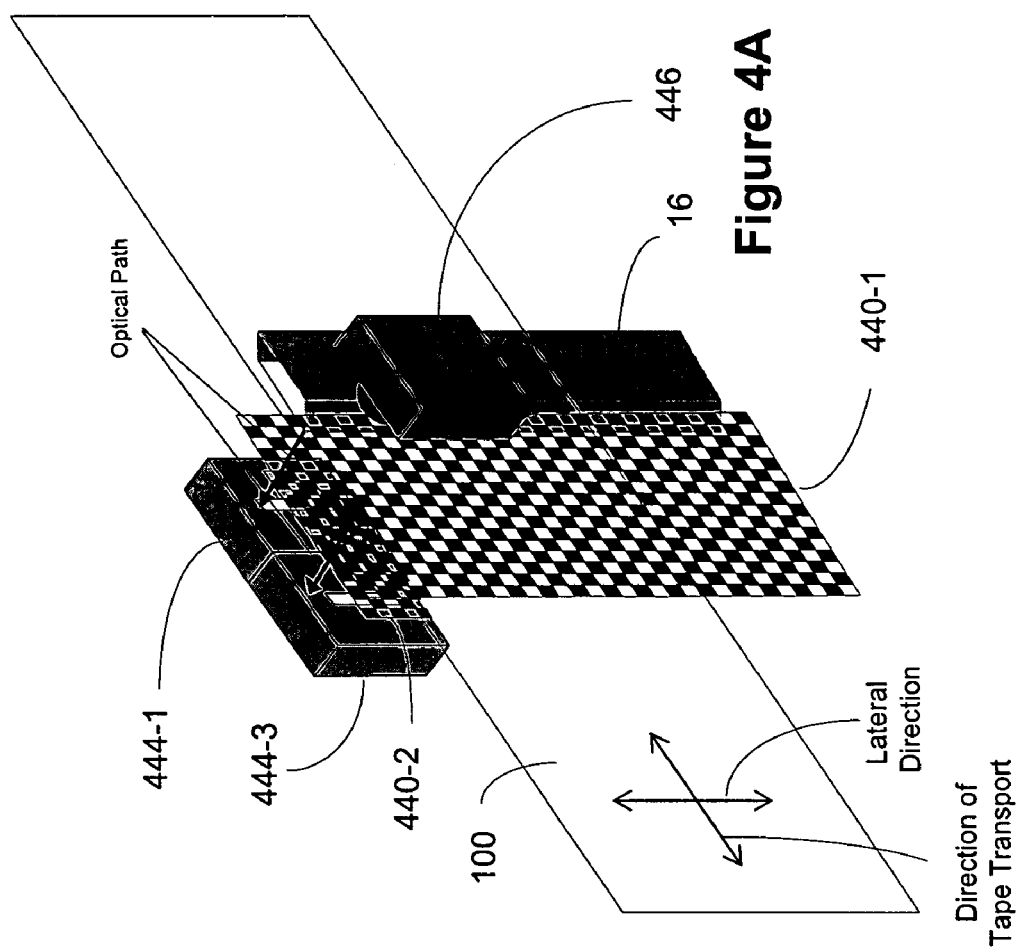
FIGS. 4A, 4B, and 4C illustrate various views of another exemplary servo system including an optical servo system configured to sense the edge of a storage medium.
Figures 4B, 4C:
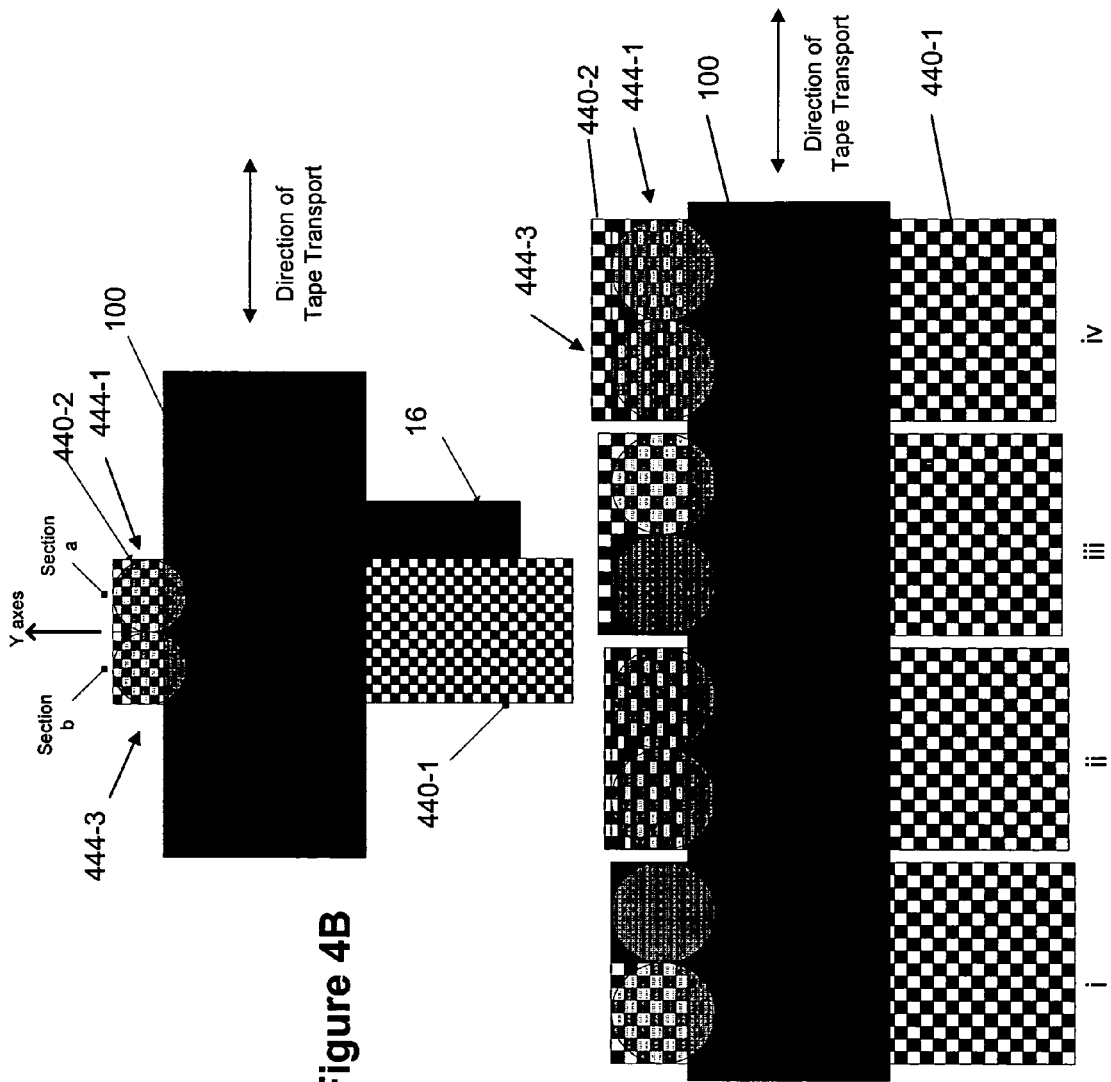

FIGS. 4A, 4B, and 4C illustrate an exemplary optical servo system including two stationary transmissive optical sensors 444-1, 444-3 and two optically encoded transparent masks 440-1, 440-2 provided to determine positional information. One mask 440-1 is coupled to the read/write head and a second mask 440-2 is attached or stationary with respect to the optical sensors 444-1, 444-3. The optical sensors 444-1, 444-3 may be located side-by-side in the longitudinal direction or direction of tape transport. The stationary mask 440-2 includes two side-by-side sections (see FIG. 4B), which may be (at least in part) spatially complementary to each other. For example, one section may be a mirror image of the other section about a y-axis lying in the lateral direction. Stationary mask 440-2 may comprise rows, each row corresponding to a data track on a recording tape, which at least partially obstructs light to the optical sensing elements. In another example, each stationary mask section may comprise a checkerboard pattern of alternating shapes, such as squares or rectangles.

The moving mask 440-1 attached or in a fixed relationship relative to head 16 may include a pattern, such as a checkerboard pattern, corresponding to the pattern on one section of stationary mask 440-2. The moving mask 440-1 may have a width in the longitudinal direction that is greater than or equal to the width of the stationary mask 440-1. As head 16 moves in the lateral direction, the moving mask 440-1 overlays the stationary mask 440-2 between light source 46 and sensors 440-1, 440-2. For a mask pattern comprising a checkerboard pattern, the overlay of a moving mask 440-1 row over a stationary mask 440-2 row is detected by the optical sensors 444-1, 444-3. Each row crossing may correspond to a data track crossing, thereby providing an indication of lateral position of head 16 to sensors 444-1, 444-3. As tape 100 moves laterally, the light is obstructed to sensors 444-1, 444-3. The total light reaching the sensors 444-1, 444-3 through the masks 440-1, 440-2 corresponds to lateral tape motion, i.e., the total overlay of the tape 100 over the sensors 444-1, 444-3. Using the information concerning relative position of head 16 to sensors 444-1, 444-3 and lateral tape motion, a controller (not shown) of this example determines relative position of head 16 to tape 100, allowing control of the position of head 16 with respect to tape 100. In particular, the correspondence of the mask rows to data tracks provides fine measurement and control of the relative position of head 16 to the data tracks.

More specifically, the optical paths between light source 46 and two stationary transmissive optical sensing devices 444-1, 444-3 are blocked by the image of the edge of tape 100, and two pattern encoded mask bars 440-1 and 440-2, one attached to the moving read/write head 16 and the other stationary with respect to the optical sensing devices. Sensing devices 444-1, 444-3 provide two position signals as the read/write head 16 moves laterally with respect to tape 100. The two position signals are complementary to each other (e.g., 180 degrees out of phase) and quantized in nature to provide direction and magnitude of an offset.

FIGS. 4B and 4C illustrate patterns included with both masks 440-1 and 440-2 in greater detail over varying offset positions. The stationary mask 440-2 has two sections (a, b) positioned side-by-side along the direction of tape transport, each section having a checkerboard pattern with black (optical blocking) and white (optical transparent) blocks, sections a and b. Each section a, b is the mirror image of the other section about the y-axis. In one example, the size of the square or rectangular block of the checkerboard pattern can be associated with data track widths, e.g., a subdivision or multiple of the data track width. Those of ordinary skill in the art will recognize that shapes other than squares may be employed such as rectangles, triangles, circles, and the like.

In one example, the dimensions of the squares are chosen to be 0.5 data track widths. Each section of the stationary mask 440-2 blocks, at least partially, the optical path of one of the two sensors 444-1, 444-3 (shown as circles in FIG. 4C). The moving mask 440-1 may have a homogeneous checkerboard pattern with the same square block dimensions as the stationary mask. In one example, mask 440-1 is wider than mask 440-2 and head 16, but in other examples mask 440-1 may have various sizes including equal to or smaller than mask 440-2 in the lateral direction.

FIG. 4C illustrates several alignments (shown as i, ii, iii, and iv) of masks 440-1, 440-2 and the edge of tape 100 as head 16 (not shown in FIG. 4C) and mask 440-1 move across the width of tape 100. As illustrated in FIG. 4C, each optical sensing element goes through a cycle of being semi-blocked by the two masks 440-1, 440-2 and tape 100 as the black and transparent squares line up to respective black and transparent squares, to being completely blocked as the black and the transparent squares of the moving mask 440-2 line up to respective transparent and black squares of the stationary mask 440-1. Note that because the stationary mask 440-2 sections are complementary, one sensor experiences minimum light transmission while the other sensor experiences maximum light transmission. Since the optical path for both sensors experiences cycles of maximum light transmission to minimum light transmission for each track length's motion of the head, the resulting positioning signals generally have a wider dynamic range (and better signal-to-noise ratio) than previous servo systems. With proper signal processing, as will be apparent to those of ordinary skill in the art, the system provides a null position signal for each row of squares shown in FIG. 4C.

In one example, if signals b1 and b3 represent the outputs of sensors 444-1 and 444-3, respectively, signal b1−b3 represents a signal proportional to the position of the read/write head 16, and signal b1+b3 represents a signal proportional to the position of tape 100 (i.e., related to LTM). Using well known servo system techniques, a servo controller may use the sum and difference signals to determine and control the position of the read/write head 16 relative to the edge of tape 100.

The above detailed description is provided to illustrate exemplary embodiments and is not intended to be limiting. It will be apparent to those of ordinary skill in the art that numerous modification and variations within the scope of the present invention are possible. For example, various exemplary methods and systems described herein may be used alone or in combination with various other positional and/or servo methods and systems whether described herein or otherwise including, e.g., optical or magnetic servo methods and systems. Additionally, particular examples have been discussed and how these examples are thought to address certain disadvantages in related art. This discussion is not meant, however, to restrict the various examples to methods and/or systems that actually address or solve the disadvantages.

The invention claimed is:

1. A method for positioning a transducer head relative to a magnetic storage medium, comprising:
    illuminating a first mask, a second mask, and an edge of a storage medium;
    detecting an intensity of light passing through the first mask, the second mask, and by the edge of the storage medium with a detector, wherein the first mask is in a fixed spatial relationship with respect to a transducer head, the second mask is in a fixed spatial relationship to the detector, and the transducer head and the detector are operable to move relative to each other; and
    determining a position of an edge of the storage medium.

2. The method of claim 1, further comprising repositioning the transducer head relative to the storage medium based on the position of the edge of the storage medium.

3. The method of claim 1, wherein illuminating the first mask includes illuminating a window formed by a transmissive portion of the first mask and the edge of the storage medium.

4. The method of claim 3, repositioning the transducer head based on the intensity of the detected light passing through the window.

5. The method of claim 3, wherein the transmissive portion of the mask includes an aperture.

6. The method of claim 3, further comprising illuminating a second window formed by a second transmissive portion of the mask and a second edge of the storage medium.

7. The method of claim 3, further comprising:
    illuminating a third window formed by a third transmissive portion of the mask having a width greater than the width of the recording medium and opposing edges of the recording medium; and
    detecting an intensity of light passing through the third window.

8. The method of claim 1, wherein the detector has at least two sensing elements.

9. The method of claim 1, wherein one of the first mask and the second mask includes two spatially complementary patterns, and the other of the first mask and the second mask includes a pattern corresponding to one of the spatially complementary patterns.

10. The method of claim 1, wherein one of the first mask and the second mask includes a pattern of transmissive sections and non-transmissive sections.

11. A head positioning servo system, comprising:
    a transducer head;
    a first mask and a second mask;
    a light source for illuminating an edge of a magnetic storage medium and the first and second masks;
    a detector for detecting light from the light source illuminating the edge of the magnetic storage medium and the first and second masks; and
    a controller for adjusting the position of the transducer head based on the detected light, wherein the first mask is in a fixed spatial relationship with respect to the transducer head, the second mask is in a fixed spatial relationship with respect to the detector, and the transducer head is operable to move relative to the detector.

12. The system of claim 11, wherein the first mask comprises an optically encoded mask disposed between the light source and the detector.

13. The system of claim 11, wherein the first mask includes at least one transmissive portion that creates a window with the edge of the storage medium.

14. The system of claim 11, further comprising a second window formed by a second transmissive portion of the mask and a second edge of the storage medium.

15. The system of claim 11, further comprising a third window formed by a third transmissive portion of the mask having a width greater than the width of the recording medium and opposing edges of the recording medium.

16. The system of claim 11, wherein the detector has at least two sensing elements.

17. The system of claim 11, wherein one of the first mask and the second mask includes two spatially complementary patterns, and the other of the first mask and the second mask includes a pattern corresponding to one of the spatially complementary patterns.

18. The system of claim 11, wherein one of the first mask and the second mask includes a pattern of transmissive sections and non-transmissive sections.

* * * * *